US010053381B2

(12) United States Patent
Ogut et al.

(10) Patent No.: US 10,053,381 B2
(45) Date of Patent: Aug. 21, 2018

(54) PULSE-POWER APPARATUS AND WATER TREATMENT SYSTEM FOR INHIBITING SCALE FORMATION AND MICROORGANISM GROWTH

(75) Inventors: Ali Ogut, Pittsford, NY (US); Richard J. Backus, Rochester, NY (US)

(73) Assignee: ENVIRONMENTAL ENERGY TECHNOLOGIES, INC., Rochester, NY (US)

( * ) Notice: Subject to any disclaimer, the term of this patent is extended or adjusted under 35 U.S.C. 154(b) by 702 days.

(21) Appl. No.: 13/599,209

(22) Filed: Aug. 30, 2012

(65) Prior Publication Data
US 2013/0048569 A1    Feb. 28, 2013

Related U.S. Application Data

(60) Provisional application No. 61/528,842, filed on Aug. 30, 2011.

(51) Int. Cl.
| B03C 1/02 | (2006.01) |
| B03C 1/30 | (2006.01) |
| B01D 35/06 | (2006.01) |
| C02F 1/48 | (2006.01) |
| C02F 1/00 | (2006.01) |

(Continued)

(52) U.S. Cl.
CPC ........ *C02F 1/487* (2013.01); *C02F 2103/023* (2013.01); *C02F 2303/20* (2013.01); *C02F 2303/22* (2013.01)

(58) Field of Classification Search
CPC ........ B01D 17/12; B01D 21/01; B01D 21/30; B01D 27/08; B01D 29/21; B01D 35/06; B01D 2201/50; C02F 1/30; C02F 1/36; C02F 1/4608; C02F 1/48; C02F 1/66; C02F 1/487; C02F 1/5236
USPC ......... 134/113; 137/803; 204/554, 555, 557, 204/604, 660, 661, 663; 210/85, 94, 122, 210/138, 143, 222, 223, 243, 695, 696, 210/702, 748.01; 252/175
See application file for complete search history.

(56) References Cited

U.S. PATENT DOCUMENTS 4,694,376 A * 9/1987 Gesslauer ..................... 361/235
5,702,600 A   12/1997 Pandolfo
(Continued)

FOREIGN PATENT DOCUMENTS

WO    WO 2011079509 A1 *  7/2011 ............... A61L 9/22

*Primary Examiner* — Hayden Brewster
(74) *Attorney, Agent, or Firm* — FisherBroyles, LLP; Andrew K. Gonsalves, Esq.

(57) ABSTRACT

The present invention relates to an apparatus for inhibiting scale formation and microorganism growth within a moving water system, with the apparatus including: (i) a pulse-power assembly having a fly-back pulse generator circuit effective to produce a current pulse that when terminated yields a voltage spike and generates a plurality of frequencies of energy, where the fly-back pulse generator circuit comprises a coil as an integral portion of the fly-back pulse generator circuit; and (ii) a chamber for passing water from the moving water system therethrough, where the coil is wound around the chamber so as to transmit the plurality of frequencies of energy into the chamber in order to inhibit scale formation and microorganism growth within the moving water system. Water treatment systems and methods of using the apparatus are also provided.

24 Claims, 10 Drawing Sheets

SCALE REMOVAL

(51) Int. Cl.
  *C02F 1/34* (2006.01)
  *B08B 7/00* (2006.01)
  *C02F 9/00* (2006.01)
  *C02F 103/02* (2006.01)

(56) References Cited

U.S. PATENT DOCUMENTS

| | | | |
|---|---|---|---|
| 6,063,267 A | | 5/2000 | Crewson et al. |
| 7,981,288 B2* | | 7/2011 | Bradley ............... C02F 1/487 |
| | | | 204/660 |
| 2003/0078620 A1* | | 4/2003 | Waltman ............. A61N 1/3975 |
| | | | 607/5 |
| 2003/0128555 A1* | | 7/2003 | Schemmann ....... H02M 3/3385 |
| | | | 363/16 |
| 2007/0012571 A1* | | 1/2007 | Beckley et al. ............... 204/667 |
| 2007/0013354 A1* | | 1/2007 | Mok et al. ................... 323/284 |
| 2007/0272621 A1 | | 11/2007 | Dresty, Jr. |
| 2009/0242407 A1* | | 10/2009 | Shiga ....................... C02F 1/48 |
| | | | 204/557 |
| 2010/0032030 A1 | | 2/2010 | Peterson |
| 2012/0269677 A1* | | 10/2012 | Zhou ........................ A61L 9/22 |
| | | | 422/4 |
| 2012/0305035 A1* | | 12/2012 | Mak et al. ................... 134/113 |

* cited by examiner

Schematic Presentation of Scale Formation on Heat Transfer Surface

Circuit Schematic

SCALE REMOVAL

Figure 9

PULSE-POWER APPARATUS AND WATER TREATMENT SYSTEM FOR INHIBITING SCALE FORMATION AND MICROORGANISM GROWTH

CROSS-REFERENCE TO RELATED APPLICATIONS

This application claims priority benefit of U.S. Provisional Patent Application Ser. No. 61/528,842, filed Aug. 30, 2011, the disclosure of which is hereby incorporated by reference herein in its entirety.

FIELD OF THE INVENTION

The present invention is broadly directed to pulse-power apparatuses, systems, and methods for inhibiting scale formation and microorganism growth within moving water systems.

BACKGROUND OF THE INVENTION

Conventional chemical treatment of moving water systems such as cooling towers necessitates the use of hazardous materials that are continuously added the cooling tower water (CTW) through a drip system to prevent scale and microorganism build up in the HVAC equipment, pipes, and manifolds.

Scales are formed in HVAC equipment such as heat exchangers, condensers, evaporators, and cooling towers when hard water is heated or cooled. In cooling towers, even if the water is soft, the water quickly becomes hard due to evaporation. One of the most common types of scale is calcium carbonate, $CaCO_3$, which forms from calcium and bicarbonate ions present in the water. The precipitation of these ions occurs due to their having less solubility in hot water, thereby causing hard scale formation on heat transfer surfaces (shown schematically in FIG. 1), reducing their efficiency.

Generally, scales are removed using acid chemicals, which procedure shortens the life of the equipment. In addition, chemicals in the concentrated form are often acute toxins, and their use is undesirable. Further, unless chemicals are added at the right time and rate, the use of chemicals to remove scale can be ineffective. Also, if improperly added to a system, chemicals may cause severe operational problems.

Alternative methods such as the use of mechanical mixing, vortex flow devices, and ultrasound have been proposed and are being used as alternative techniques to the use of chemicals. Unfortunately, these methods are mostly expensive and require heavy maintenance for proper operation.

As noted above, chemical treatment is also used to kill or prevent microorganism growth, particularly with regard to various types of bacteria that contaminate water systems. However, as with the chemical treatment for scale formation, the use of chemicals to kill, treat, or prevent biofilm and microorganism growth in water systems is costly, requires maintenance, and presents safety issues.

While pulsed power water treatment systems have been described for use in treating scale and/or biofilm growth, these systems can be cumbersome to implement into existing water treatment systems, ineffective in treating both scale and biofilm, and/or require high voltage.

The present invention is directed to addressing these and other deficiencies in the art.

SUMMARY OF THE INVENTION

The present invention is broadly directed to pulse-power apparatuses, systems, and methods for inhibiting scale formation and microorganism growth within moving water systems.

In one aspect, the present invention provides an apparatus for inhibiting scale formation and microorganism growth within a moving water system, with the apparatus including: (i) a pulse-power assembly having a fly-back pulse generator circuit effective to produce a current pulse that when terminated yields a voltage spike and generates a plurality of frequencies of energy, where the fly-back pulse generator circuit comprises a coil as an integral portion of the fly-back pulse generator circuit; and (ii) a chamber for passing water from the moving water system therethrough, where the coil is wound around the chamber so as to transmit the plurality of frequencies of energy into the chamber in order to inhibit scale formation and microorganism growth within the moving water system.

In another aspect, the present invention provides a water treatment system for inhibiting scale formation and microorganism growth, with the water treatment system including: (i) a moving water system; and (ii) an apparatus of the present invention in fluid connection with a pipe of the moving water system.

In a further aspect, the present invention provides a method for inhibiting scale formation and microorganism growth in a moving water system, with the method including the steps of: (i) integrating an apparatus of the present invention into a moving water system; and (ii) using the apparatus to inhibit scale formation and microorganism growth in the moving water system.

The apparatus, system, and method of the present invention have a number of advantages over the prior art. For example, the present invention provides apparatuses, systems, and methods that present low-cost, efficient, and low-maintenance pulse-power supply alternatives for scale removal and biocide processes for use in moving water systems. In certain embodiments, the apparatuses, systems, and methods of the present invention are suitable for use in small to medium size cooling systems that currently have no cheap alternative to chemical treatments. The present invention can simultaneously prevent and reduce scale build up in a moving water system, as well as combat the growth of unwanted biological hazards to the system.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, if provided, like reference numerals contained in the drawings are meant to identify similar or identical elements.

DETAILED DESCRIPTION OF THE INVENTION

The present invention is broadly directed to pulse-power apparatuses, systems, and methods for inhibiting scale formation and microorganism growth within moving water systems.

In one aspect, the present invention provides an apparatus for inhibiting scale formation and microorganism growth within a moving water system, with the apparatus including: (i) a pulse-power assembly having a fly-back pulse generator circuit effective to produce a current pulse that when terminated yields a voltage spike and generates a plurality of frequencies of energy, where the fly-back pulse generator circuit comprises a coil as an integral portion of the fly-back pulse generator circuit; and (ii) a chamber for passing water from the moving water system therethrough, where the coil is wound around the chamber so as to transmit the plurality of frequencies of energy into the chamber in order to inhibit scale formation and microorganism growth within the moving water system.

Figure 1:
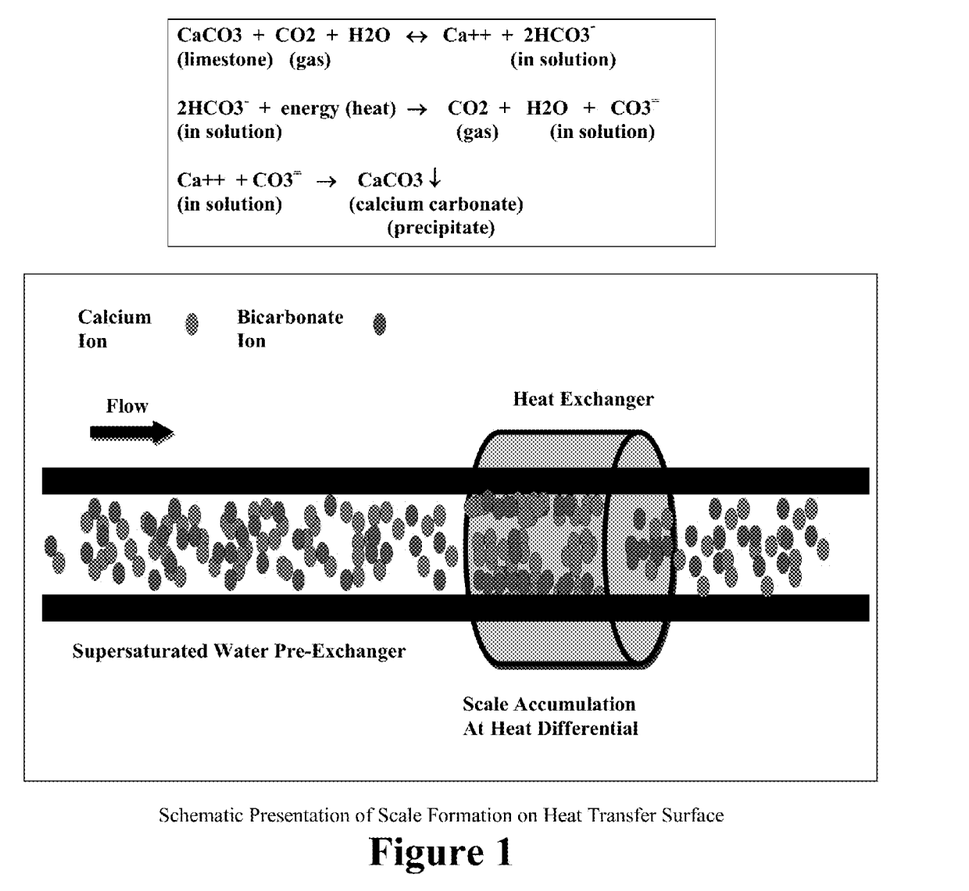
FIG. 1 is a schematic illustration of scale formation on a heat transfer surface and chemical formulae regarding scale formation.

As shown in FIG. 1, in one embodiment, the apparatus of the present invention includes a pulse-power assembly having a fly-back pulse generator circuit that includes a coil wound around a pipe, with the pipe corresponding to the chamber for passing water from a moving water system therethrough. In particular, in accordance with the present invention, the fly-back pulse generator circuit of the pulse-power assembly includes a pulse generator driving a power transistor connected to the coil. In accordance with the present invention, the fly-back pulse generator circuit operates on a nominal power supply voltage of between about 6 and 30 volts. However, the present invention further contemplates the operation of the fly-back pulse generator circuit using power supply voltages outside of the range of 6 and 30 volts.

Figure 2:
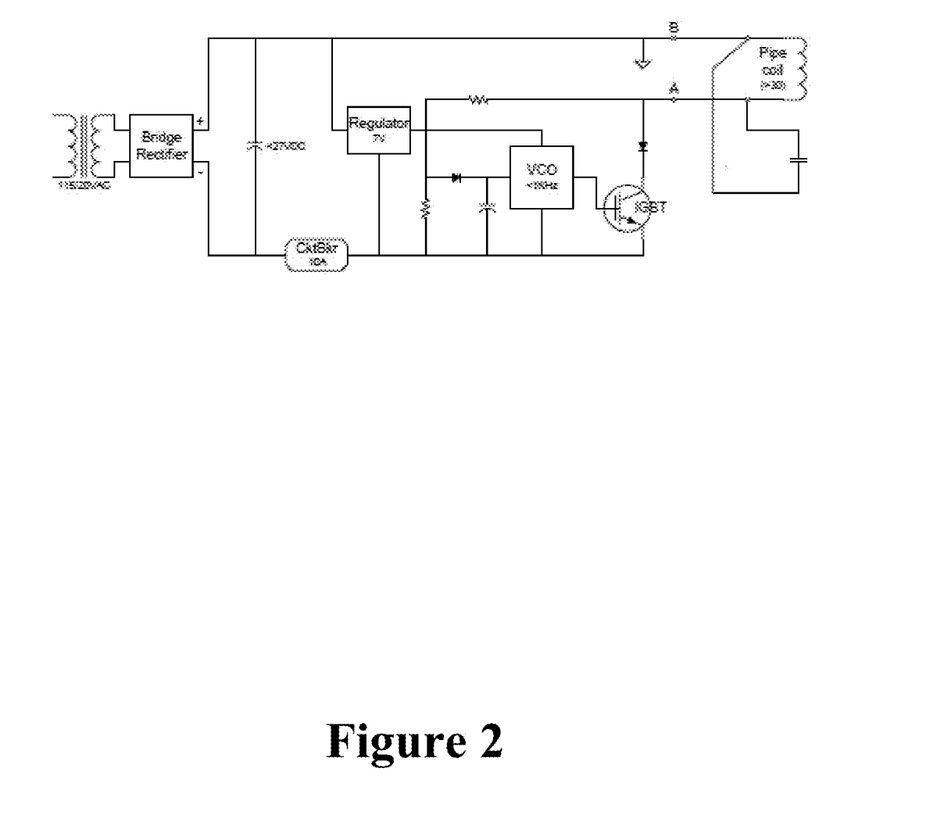
FIG. 2 is a schematic of one embodiment of the apparatus of the present invention, including a schematic of an embodiment of the fly-back pulse generator circuit of the present invention.

As shown in FIG. 2, in one embodiment, the pulse generator can be, without limitation, a voltage controlled oscillator (VCO) that is effective to adjust pulse width and the frequency of the pulses. Suitable VCOs can include, without limitation, analog, digital, or microprocessor based VCOs, as is commonly understood by those of ordinary skill in the art. In a particular embodiment, the pulse generator generates frequencies of between about 1 kHz and 300 kHz, although the present invention is not limited to pulse generators that only generate frequencies in this range. In another particular embodiment, the pulse generator generates pulses having a width of between about 33 microseconds and 1 millisecond, although the present invention is not limited to pulse generators that only generate pulses having this range of widths. In view of the present disclosure, one of ordinary skill in the art can readily understand how to integrate these and other suitable pulse generators into the fly-back pulse generator circuit for operation in accordance with the present invention.

As shown in FIG. 2, in one embodiment, the power transistor that is driven by the pulse generator can be, without limitation, an insulated-gate bipolar transistor (IGBT). However, in various other embodiments, the power transistor can include, without limitation, a field effect transistor (FET), a bipolar transistor, or a thyristor (e.g., a silicon controlled rectifier (SCR)). In view of the present disclosure, one of ordinary skill in the art can readily understand how to integrate these and other suitable power transistors into the fly-back pulse generator circuit for operation in accordance with the present invention.

Figure 3:
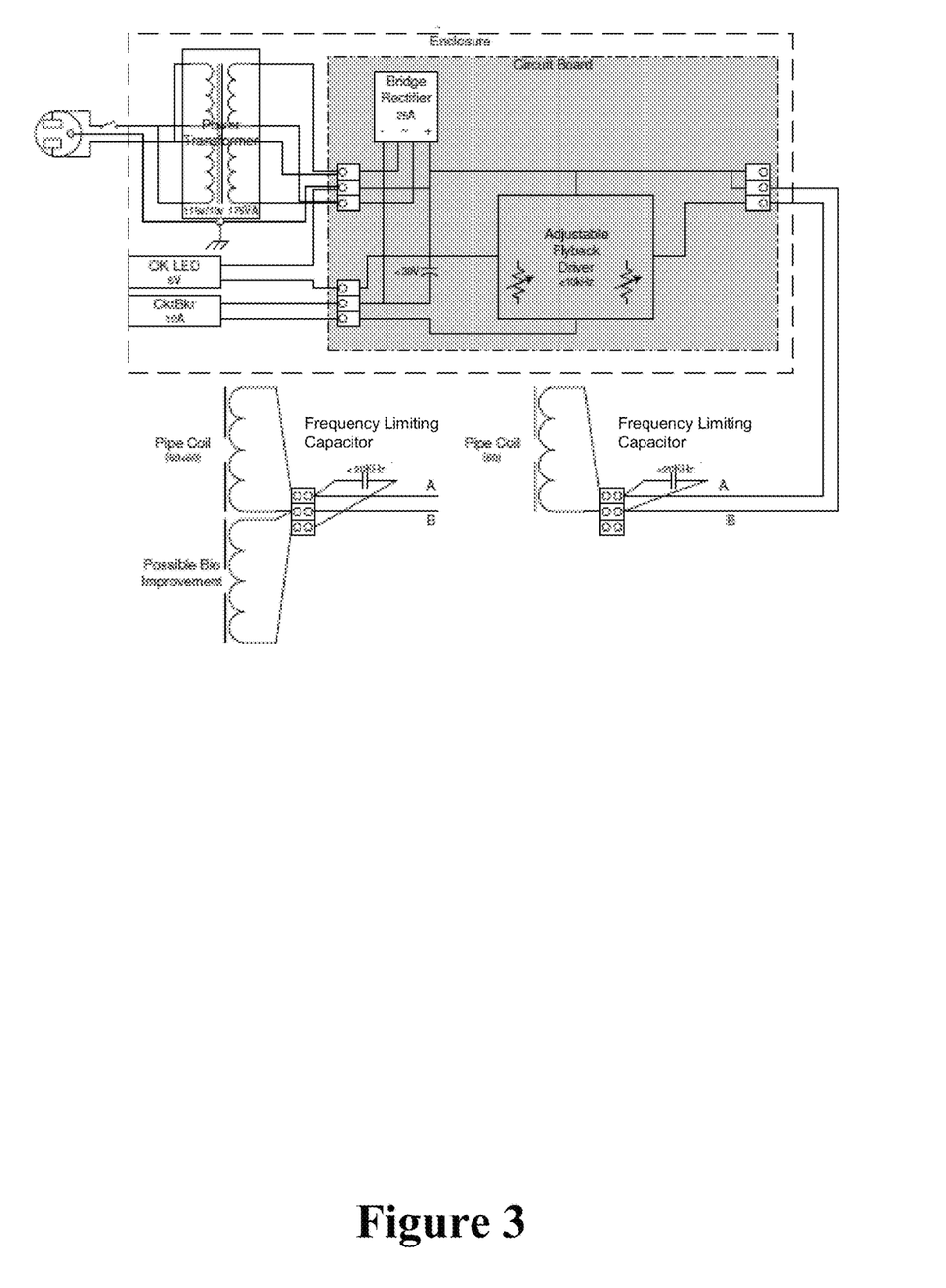
FIG. 3 is a schematic of one embodiment of the apparatus of the present invention, including a schematic of an embodiment of the fly-back pulse generator circuit of the present invention and showing a multiple coil configuration.

As shown in FIGS. 2 and 3, in particular embodiments, the fly-back pulse generator circuit can further include a capacitor, with the capacitor being configured and integrated into the circuit to limit the upper range of the frequencies of energy across the coil. In a particular embodiment, the capacitor is a high voltage capacitor of such value as to limit the high frequencies in the coil to less than about 300 kHz.

The coil's inductance can be used to determine the capacitor values using the formula for resonant frequency, as follows:

$$f = \frac{1}{2\pi\sqrt{LC}}$$

where f=frequency (Hz); L=inductance of the coil (henrys); and C=capacitance of the capacitor (farads).

Further, the coil's dimensions can be used to determine the appropriate inductance for the coil, as shown in the below formula:

$$L = \frac{r^2 N^2}{9r + 10l}$$

where L=inductance of the coil (µH); N=number of turns of the coil; r=outer radius of the coil (inches); and l=length of the coil (inches).

In another embodiment, the apparatus of the present invention can further include a transformer connected to the fly-back pulse generator circuit. The transformer is used to adjust the voltage generated by the fly-back pulse generator circuit. In a particular embodiment, the transformer can be used to generate a peak voltage of up to 850 volts, although the effective use of the apparatus as described herein does not require the use of a transformer.

As shown in FIG. 3, in a particular embodiment, the apparatus can further include at least one additional coil wound around the chamber and connected to the fly-back pulse generator circuit.

Figure 4:
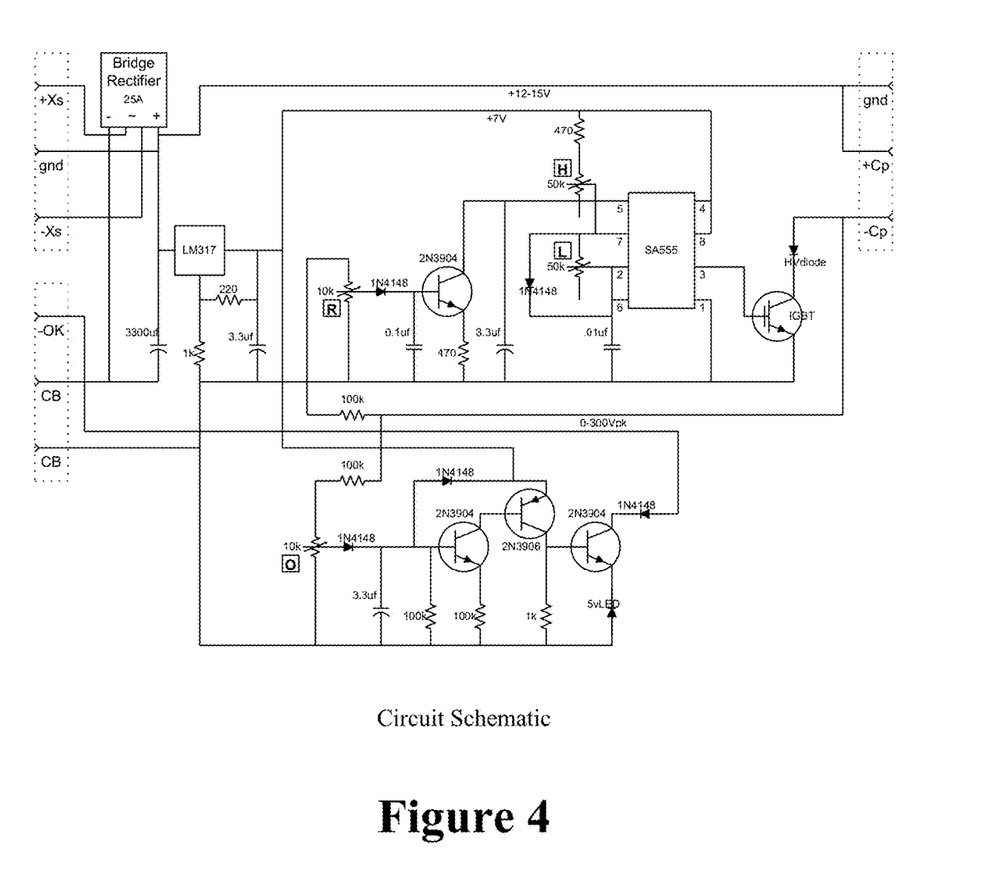
FIG. 4 is a schematic of a circuit board of one embodiment of the fly-back pulse generator circuit of the present invention.
Figure 5A:
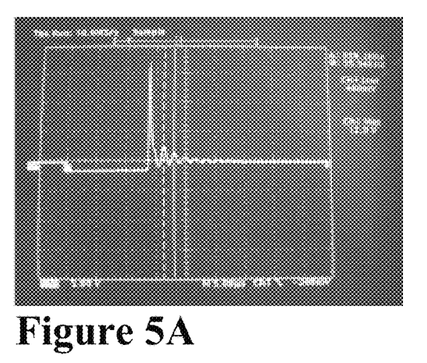
FIGS. 5A-5E are photographs of waveforms generated by various embodiments of the fly-back pulse generator circuit of the present invention. The waveforms were generated by operating the apparatus of the present invention with the chamber containing water and being installed in the field.
Figure 5B:
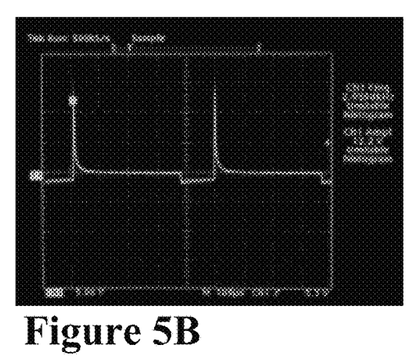
Figure 5C:
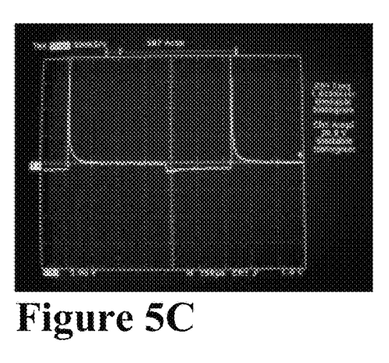
Figure 5D:
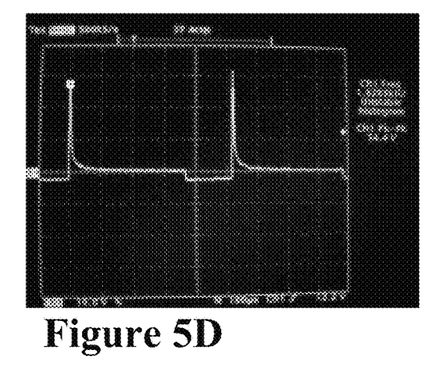
Figure 5E:
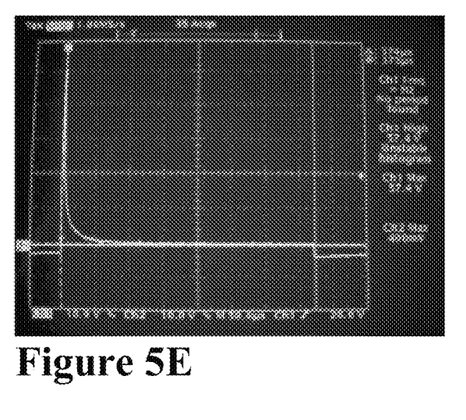

As discussed herein, FIG. 2 and FIG. 3 provide schematics of particular embodiments of the fly-back pulse generator circuit. FIG. 4 is a schematic of one embodiment of a circuit board for an operable fly-back pulse generator circuit of the apparatus of the present invention. Based on these exemplary schematics and the disclosures provided herein, one of ordinary skill in the relevant art can readily understand how to make and use the apparatus of the present invention.

Figure 6A:
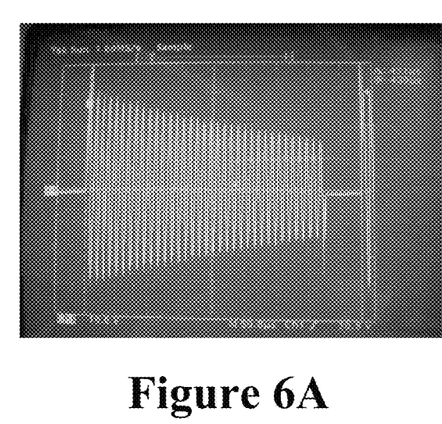
FIGS. 6A-6B are photographs of waveforms generated by various embodiments of the fly-back pulse generator circuit of the present invention. The waveforms were generated by operating the apparatus of the present invention with a chamber that did not contain water.
Figure 6B:
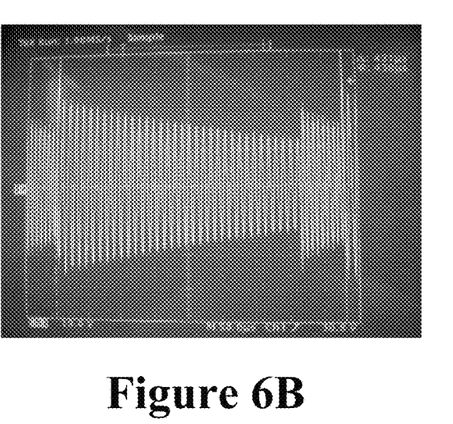

In operation, the fly-back pulse generator circuit includes the coil as an integral part of the circuit. The fly-back pulse generator circuit is effective to produce a signature waveform during operation, as shown in FIGS. 5A-5E. In particular, the fly-back pulse generator circuit is effective to produce a current pulse that when terminated yields a voltage spike and generates a plurality of frequencies of energy. Because the coil is used as an integral portion of the fly-back pulse generator circuit, the current pulse (DC) produces a magnetic field across the coil, which magnetic field is effective to treat water inside the chamber. When the current pulse is terminated, the abrupt transition generates a plurality of frequencies of energy (AC), which in turn are transmitted into the chamber to treat the water in the chamber. FIGS. 5A-5E are exemplary waveforms that exhibit the DC current pulse (flat line) followed by the voltage spike. The illustrated waveforms also show no substantial ringing. Thus, the present invention does not require a waveform that includes ringing. FIGS. 6A and 6B illustrate exemplary waveforms generated by the fly-back pulse generator circuit when no water is contained in the chamber.

With regard to the chamber of the apparatus of the present invention, suitable chambers can be any pipe or pipe-like structure that can be used to pass moving water therethrough and can be used for winding the coil of the fly-back pulse generator circuit around. Generally, as provided herein, chamber dimensions of the various embodiments of the present invention can be implemented and fabricated to accommodate the required coil length and space requirements for the apparatus. In one embodiment, the chamber is a portion of a pipe of the moving water system (e.g., a segment of an existing water pipe of a cooling tower). In such an embodiment, the coil of the fly-back pulse generator circuit is wound around the portion of the pipe of the moving water system, thereby defining the chamber portion of the apparatus of the present invention. In other embodiments, more than one coil can be wound around the pipe next to the first coil, thereby extending the length of the chamber portion. One advantage of this embodiment is that the coil can be wrapped by the end user or by a designated installer, without requiring any particular technical expertise. As provided herein, the coil can be wound by hand around the pipe for a designated number of turns or until a designated length of coil has been so wound around the pipe. This provides an advantage over existing coil systems in that the present invention does not require the coils to be encapsulated in a pipe having flanges that need to be installed into a cut section of a designated pipe and does not require a bypass to be specifically built for the installation. By wrapping the coil according to the present invention, installation of the unit is easy for the end user to install. In particular, the end user does not need to do any special mechanical or electrical work as preparation for installation of the apparatus of the present invention.

In another embodiment, the chamber can be configured to be inserted as a portion of the moving water system. This can be achieved in various ways as understood by those of ordinary skill in the relevant art. For example, a chamber having the coil wound around it can be retrofitted as a segment of the pipe of the exiting moving water system.

Alternatively, in a different embodiment, the apparatus can be skid-based, so that the apparatus further includes: (i) an inlet tube for receiving water from the moving water system and for feeding the water into the chamber; (ii) an outlet tube for returning the water fed into the chamber from the moving water system back into the moving water system; and (iii) a pump for drawing the water into the chamber from the inlet tube and for facilitating the movement of the water from the chamber back into the moving water system through the outlet tube. Any standard water pump can be used for the apparatus and such pumps and the operation thereof are readily known by those of ordinary skill in the art. In accordance with this type of embodiment of the apparatus, the pump is effective to circulate a certain amount of water (as determined by the user) from the moving water system (e.g., a cooling tower) continuously in a closed loop. Therefore, in this type of embodiment, the apparatus can treat water from the moving water system independent of any pumping or circulating mechanism of the moving water system.

As provided, the apparatus of the present invention allows for it to be integrated into an existing water treatment system's circulation and provide the water treatment required to circulation systems over the course of multiple passes.

One additional advantage of the apparatus of the present invention is that it can be used along with the addition of a non-driven second coil. This coil is inductively coupled to the first coil and provides a longer ring as well as a longer area for the electrical field differential.

In another aspect, the present invention provides a water treatment system for inhibiting scale formation and microorganism growth, with the water treatment system including: (i) a moving water system; and (ii) an apparatus of the present invention in fluid connection with a pipe of the moving water system.

With respect to the water treatment system of the present invention, all of the various embodiments of the presently disclosed apparatus are useful for use in the system. Therefore, the various embodiments of the apparatus are not further described in detail herein below as it pertains to the water treatment system of the present invention.

In one particular embodiment, the water treatment system of the present invention further includes at least one additional coil wound around the chamber and connected to the fly-back pulse generator circuit of the apparatus.

In another particular embodiment, the water treatment system of the present invention further includes at least one more apparatus of the present invention in fluid connection with a pipe of the moving water system.

In accordance with the water treatment system of the present invention, the moving water system can be a closed-loop system, an open-loop system, or a combined closed/open-loop system. While not intending to limit the water treatment system of the present invention, suitable closed-loop systems can include, without limitation, a water cooling system (e.g., cooling tower), a water heating system, a water boiling system, an industrial process system, a chemical waste treatment system, an hazardous waste treatment system, a biological waste treatment system, and the like. While not intending to limit the water treatment system of the present invention, suitable open-loop systems can include, without limitation, a potable water treatment system, a chemical waste treatment system, an hazardous waste treatment system, a biological waste treatment system, and a wastewater treatment facility. The water treatment system of the present invention can also be used with a combined closed-loop and open-loop system. Such combined systems are well known by those of ordinary skill in the art.

Figure 7A:
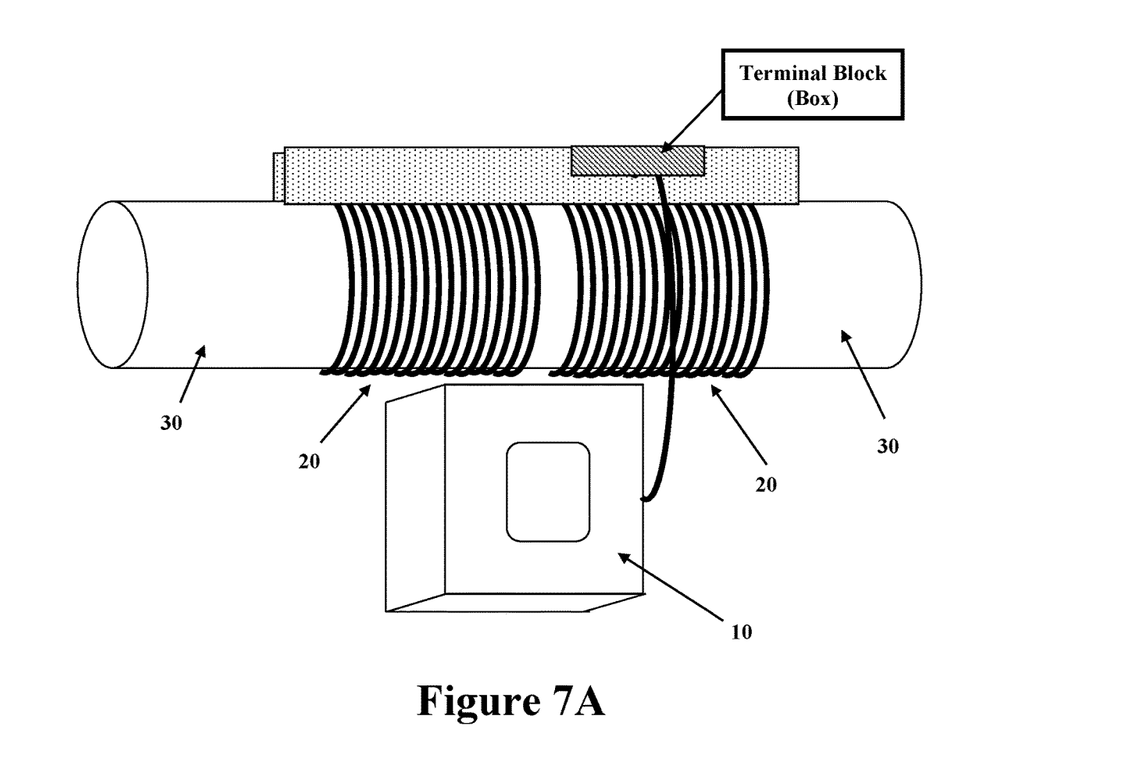
FIGS. 7A-7B are photographs of embodiments of an apparatus of the present invention integrated into a moving water system in the field. The embodiments shown include apparatuses having multiple coils wound around an existing pipe of the moving water system.
Figure 7B:
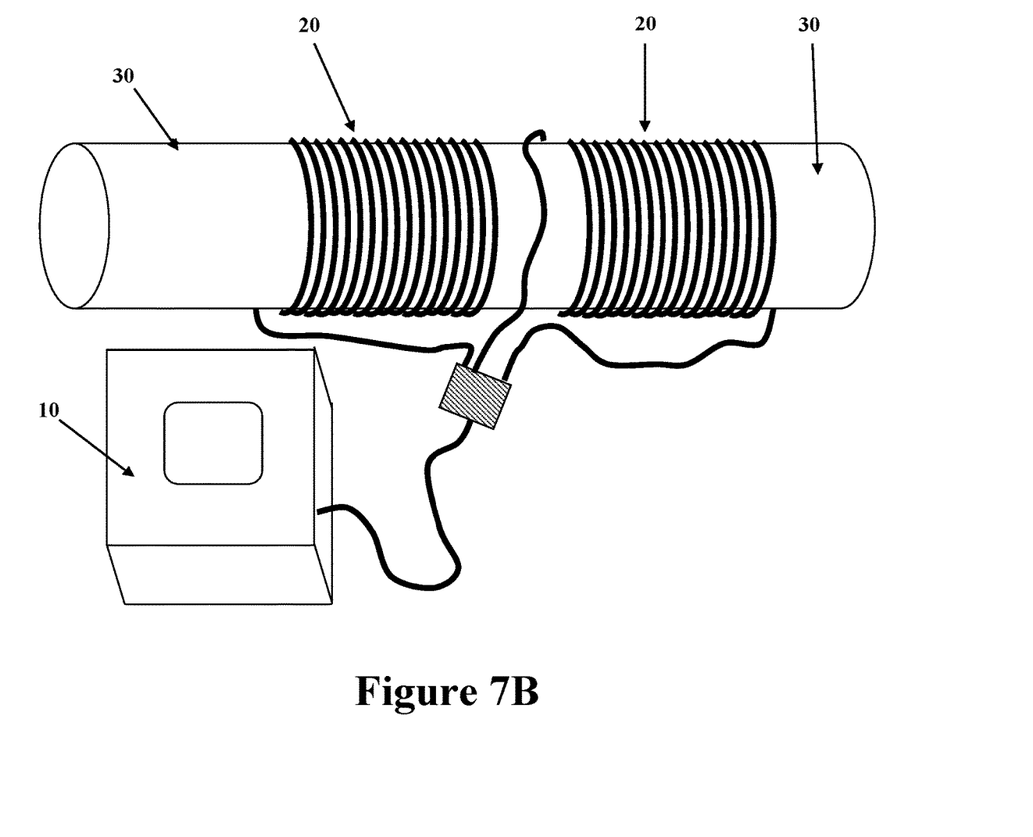
Figure 8:
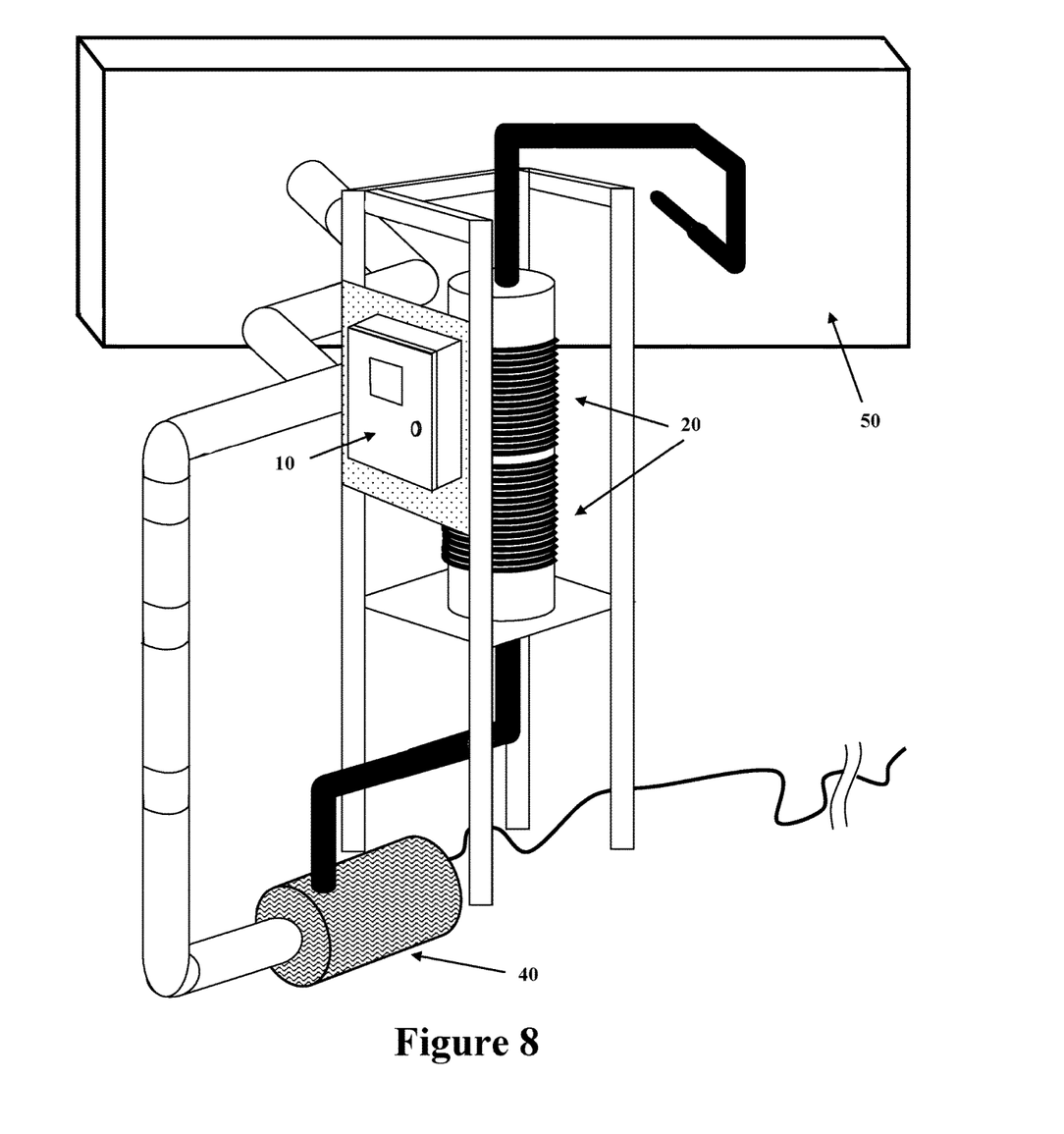
FIG. 8 is a photograph of one embodiment of an apparatus of the present invention provided as a skid-based apparatus and integrated into a moving water system in the field.

Various embodiments of apparatuses of the present invention integrated into moving water systems are shown in FIGS. 7A, 7B, and 8. Although FIGS. 7A, 7B, and 8 show particular configurations of the apparatuses in relation to the moving water systems, the present invention is not limited to these particular configurations.

FIGS. 7A-7B show embodiments of apparatuses of the present invention that are integrated into a moving water system in the field, where the apparatuses have multiple coils wound around an existing pipe of the moving water system. As shown in FIGS. 7A and 7B, coils 20 of the fly-back pulse generator circuit are wound around existing pipe 30 of the moving water system, with box 10 being mounted near pipe 30 and electrically connected to coils 20. Box 10 contains the circuit board that includes other portions of the fly-back pulse generator circuit (i.e., portions other than coils 20).

FIG. 8 shows one embodiment of an apparatus of the present invention provided as a skid-based apparatus and integrated into a moving water system 50 in the field. As shown in FIG. 8, the chamber of the apparatus is mounted on a skid, with coil 20 wound around the mounted chamber. Box 10 is also mounted on the skid and contains the circuit board that includes other portions of the fly-back pulse generator circuit of the present invention (i.e., portions other than coil 20). Water pump 40 is also mounted on the skid and is used to pump water from the moving water system through the chamber of the apparatus and then back into the moving water system.

In a further aspect, the present invention provides a method for inhibiting scale formation and microorganism growth in a moving water system, with the method including the steps of: (i) integrating an apparatus of the present invention into a moving water system; and (ii) using the apparatus to inhibit scale formation and microorganism growth in the moving water system.

With respect to the presently disclosed method for inhibiting scale formation and microorganism growth in a moving water system, all of the various embodiments of the presently disclosed apparatus are useful for use in the method. Therefore, the various embodiments of the apparatus are not further described in detail herein below as it pertains to the disclosed method for inhibiting scale formation and microorganism growth in a moving water system.

In one embodiment of the presently disclosed method, the integrating step involves winding the coil of the apparatus around a portion of a pipe of the moving water system.

In another embodiment of the presently disclosed method, the integrating step involves replacing a portion of a pipe of the moving water system with the chamber of the apparatus. In this embodiment, the coil is either already wound around the chamber at the time of the replacement or wound around the chamber after replacement.

In another embodiment of the presently disclosed method, the integrating step involves: (i) providing the apparatus in a configuration so that the apparatus further includes (a) an inlet tube for receiving water from the moving water system and for feeding the water into the chamber; (b) an outlet tube for returning the water fed into the chamber from the moving water system back into the moving water system; and (c) a pump for drawing the water into the chamber from the inlet tube and for facilitating the movement of the water from the chamber back into the moving water system through the outlet tube; and (ii) connecting the inlet tube and the outlet tube to the pipe of the moving water system so that water from the moving water system can flow through the chamber of the apparatus by operation of the pump.

In another embodiment of the presently disclosed method, the method further involves integrating at least one more apparatus into the moving water system.

In accordance with the presently disclosed method, the step of using the apparatus can involve operating the fly-back pulse generator circuit to generate a plurality of frequencies of energy, where the plurality of frequencies of energy is transmitted through the chamber and effective to inhibit scale formation and microorganism growth in the moving water system.

Scale Removal

As described herein, the apparatus and water treatment system of the present invention are suitable for use in removing scale and inhibiting the formation of scale. A general explanation of how scale builds up and affects pipes of water systems is as follows. Heat differentials within moving water systems are prone to the problem of scale accumulation. The energy change is enough for the calcium and bicarbonate ions in the water to turn into mineral scale and adhere to the pipe walls. Over time the accumulation can reduce heat transfer, restrict water flow, increase pressure, and could cause pipe fractures as well as system failures.

Figure 9:
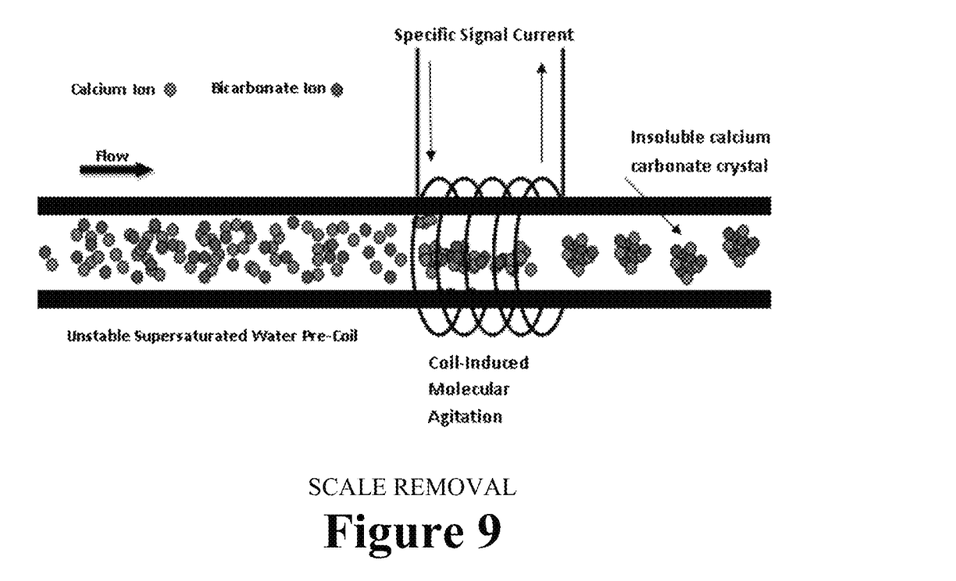
FIG. 9 is a schematic illustration of the scale removal process on a heat transfer surface using an apparatus of the present invention.

The apparatus and water treatment system of the present invention are effective for use as a preventive measure against scale build-up and in a process for removing the scale that was built up prior to the installation of the apparatus or water treatment system of the present invention. The coil that is wrapped around the pipe will input an inductive signal in the pipe and the water within it. This will cause molecular agitation that causes the ions to change crystalline structure that will no longer adhere to the walls. The resulting precipitant will be then filtered out of the system as "sludge." FIG. 9 illustrates the process of scale removal using the apparatus of the present invention.

Biocide

As described herein, the apparatus and water treatment system of the present invention are suitable for use in inhibiting microorganism growth. A general explanation of how microorganisms (e.g., bacteria) build up and affect pipes of water systems is as follows. In water systems, the build-up of bacteria in the water is a common problem that is usually treated with chemicals. For a water treatment alternative to chemical treatment to be viable it must both take care of scale and biocide so all chemicals can be removed.

According to the present invention, the apparatus's fly-back pulse generator circuit and its coil system provide a multitude of frequencies at varying voltage and power levels. This disruption causes microorganism cells to become sterile and unable to reproduce according to the literature available on the subject. Generally, the pulse power is effective in that it can contain large DC and AC components that span a wide frequency range to be effective. This can be effective against microbial cells of varying sizes.

EXAMPLES

The following examples are intended to illustrate particular embodiments of the present invention, but are by no means intended to limit the scope of the present invention.

Schematics of embodiments of the apparatus as described in the examples section are shown in FIGS. 2, 3, and 4.

Example 1

Pulse-Power Supply for Water Treatment

Described herein below and illustrated in the accompanying drawings are various embodiments of the apparatus and water treatment system of the present invention, as well as methods of making and using the apparatus and water treatment system of the present invention. While illustrative examples are provided herein, the present invention is not intended to be limited in scope to only the embodiments described herein.

In general, an electrical power supply for generating electrical fields that will control bio-matter (e.g., microorganisms such as bacteria) in chilled water cooling systems is more complex than one that just controls scale. Simple scale control has been done using fixed magnetic fields (DC) such as that of simple permanent magnets. Provided in this example is a description of one embodiment of the present invention relating to an inexpensive and easily installed scale and bio-matter control pulse system that draws less than 250 watts of power.

Experiments have shown that a strong bipolar electric field, at 1.3 J/ml and pulses longer than 50 us, will kill bacteria. In a recirculation system, lesser fields can still kill or control bacteria growth. This supply can output about 200 VA in a combination of pulsed DC plus 2 bipolar frequencies.

Simplicity and economy in installation and use are provided by using the fly-back pulse generator to power the coil. The fly-back circuit generates strong magnetic and electrical fields in the coil over a wide range of frequencies. The coil is wound around a section of water pipe in the cooling system.

This power supply creates an output that automatically adjusts to the load that the coil presents. The peak high frequency voltage is fed back to the voltage controlled oscillator (VCO) and thereby controls the duration of the DC pulse. The mid-frequency consists of the repetition rate of the DC pulses. The high frequency rate, initiated by the DC pulse termination, is manually adjustable by changing the number of coil windings or the value of the peak limiting capacitor. A 60 foot winding of wire appears to be the minimum for the coil, with 0.01 uF for the capacitor.

Circuit topology is designed to maximize power transfer into the coil and into the pipe. The capacitor is mounted on the coil so that the coil-capacitor loop is short and has low resistance providing strong electric fields. A second coil may be wound immediately in series with the first, magnetically coupled to it and adding to the electrical field strength.

Safety for the operator is provided. A circuit breaker prevents overheating and/or fire. Both coil terminals are actually and virtually grounded whenever the circuit breaker is tripped and when the coil is not connected or damaged. Coil voltages over 30 volts are energy limited by the resonance capacitor. In case of circuit failure or coil damage, there is a circuit to indicate when the coil ring voltage is absent.

Example 2

Construction of an Apparatus for Treatment of Scale and Microorganisms

Below are general guidelines on how various embodiments of the apparatus and water treatment system of the present invention were prepared. With regard to the chamber, in using PVC (although steel or other metallic pipes ordinarily used in water systems can be used), it is generally recommended that all flush joints are primed and PVC cemented. All threaded joints can include the use of sealant to prevent leaking when the system is active. Besides this all pieces fit in the logical manner and should be left to completely dry and adhere before the coil is wrapped.

The coils can be wrapped flat and tight around the main shaft of the chamber. In exemplary embodiments (referred to as Gen0.0 and Gen0.1), the Gen0.0 system used 75 turns per coil on a 4" pipe and Gen0.1 used 100 turns per coil on a 3.5" pipe. Each coil was roughly 100' of wire and can be considered the baseline for any new construction. Dual coils need to be wound in the same direction. Each coil should consist of half of the full length, so 1 double-length coil (200') can be wrapped and then cut in the center. The ends are then connected to the terminal block. The coils and terminal block can be fastened to the chamber with fasteners such as plastic ties.

As noted, in one embodiment, the coil and power supply are connected through a terminal block. Thus, in such an embodiment of the electronic water treatment system, the terminal block is a component of the system. It contains a 0.01 µf capacitor and connections to coil and pulse supply. The terminal block can be installed as close to the coil as possible so to improve system performance. DC pulse width can be between 20-250 µs. Pulse period can be between 400-600 µs.

Example 3

Operating Parameters

In one exemplary embodiment of an apparatus of the present invention, various operating parameters were observed. After the power supply has been turned on and the internal breaker is not tripped and a signal can be produced on the scope, various parameters can be observed and/or practiced, as noted below:

Connect the scope ground lead to ground, not the coil; Clip the scope probe on the capacitor terminal. The Pot marked pulse width should be set just below 300V (no water). The pot marked operating should be turned until the LED illuminates. The heatsinks should not be too warm that you would blister on contact. Some heat has to be generated due to the nature of the part. The Components are designed to generate heat byproducts. Heat should be being transferred to the box and dissipated. The signal generally resembles those waveforms shown in FIGS. 5A-5E when water is in the chamber.

At least two systems were been created. One system was put into an experimental test field resulting in little quantitative data being collected. It was 1 coil of about 75 turns and a 0.01 uF capacitance on stainless steel system. Spike voltages and frequency sweeps were gathered at a later date. Coil resonance spikes at 180V and damps to 0V in 16 us.

The second system was lab tested. It is 2 coil PVC system of 100 turns each. The current resonance capacitance is 0.01 uF. The resonance ring result in Air (dry) spikes at 300V and dampens to 150Vpk @ 94 kHz in the Main Coil. The secondary coil then has a ring from 220V to 180V @ 135 kHz. The addition of water to the chamber changes the signal to 300V dampened to 100V @ 93 kHz. The second coil then rings at 150V down to 100V @134 kHz.

The insertion of a stainless steel pipe into the chamber shows much faster dampening in the signal and both coils as expected. Increased resonance capacitance will lower the spike voltage while lowering the frequency. Slower waveforms have been stated to perform better at killing bacteria. Increased capacitance may be needed, but will be changed as needed depending on the test results.

Field Test Apparatuses: Gen0.0: DC pulse width 20 μs, pulse period 400. Gen0.1: DC pulse width 250 μs, pulse period 600.

Example 4

Field Testing

There are several methods for testing the system in the field. The simplest way is to look at the system and check the amount of scale or biological matter in the condenser. No deposit of any kind is the goal. Changes here take time to appear, so tools have been developed. The main four tools are Bio-slides, Total Dissolved Solids (TDS), Total Hardness (TH), and pH. Bio-slides measure the amount of live bacteria directly using cultures, while scale control is more difficult to quantify.

Embodiments of the apparatus of the present invention were tested in the lab as well as in the field on actual moving water systems (i.e., cooling towers). Some of the field tested apparatuses were denoted as Gen0.0 and Gen0.1. The results showed that the apparatuses of the present invention were effective to inhibit both scale and microorganism growth.

Example 5

Chamber and Coil

As a result of bench and field testing of embodiments of the apparatus, various general guidelines were observed in how to fabricate the chamber and how to install the coils. Effects of various spatial specifications on the coil and field and what can be done to compensate when changes are made are generally provided below:

Pipe Material: No direct effect on the effectiveness of the system. In lab comparison shows different signal effects: (i) Stainless Steel shortens the ring period of the system dramatically (increased loss); and (ii) PVC with air core (dry) can be used to get an estimate of signal and once filled with water the ring will be shortened.

Pipe Length: Pipe length should be long enough to support enough turns in the coil. Any excess Pipe makes no difference.

Pipe Diameter: Pipe Diameter will directly affect the coil diameter which will be discussed later.

Coil Length: More turns (same diameter)=more inductance. More inductance (same core)=larger voltage spike. More turns (more wire) allows for more power. More Power→more effective. More heat generation, higher cost and complexity. Increased coil length=more residence time in field. Not important in recirculation systems since water will be treated repeatedly.

Coil Diameter: Smaller Diameter (same turn#)=stronger Field (E=V/L). Smaller Diameter (same turn#)=less Inductance. This may be compensated for by increasing turn #. Larger Diameter (same turn#)=weaker Field (E=V/L). Compensated for by higher voltages=more power=more complexity.

Coil Thickness: The minimization of space between the metal coil wire and the water core is ideal. Increased distance between the coil wire and the core results in reduced performance (i.e. thicker pipe walls, thicker insulation on wire).

Summary: A key factor is determining the length of coil suitable for the job, as it produces the right voltage levels and does not over load the power supply (heat, circuit breaker). The same length of coil on larger or smaller pipe will self-adjust since it will be compensated by the number of turns, in that larger pipe requires less turns and vice versa, and provides roughly the same inductance regardless of pipe diameter.

As set forth herein, embodiments of the present invention discussed herein have been described by way of example in this specification. Having thus described the basic concept of the invention, it will be rather apparent to those of ordinary skill in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the invention. Additionally, the recited order of processing elements or sequences, or the use of numbers, letters, or other designations therefore, is not intended to limit the claimed processes to any order, except as may be specified in the claims. Accordingly, the invention is limited only by the following claims and equivalents thereto.

What is claimed is:

1. An apparatus for inhibiting scale formation and microorganism growth within a moving water system, said apparatus comprising:
 a pulse-power assembly comprising a transformerless fly-back pulse generator circuit comprising:
 a power transistor, and
 a coil wound around a chamber for passing water from said moving water system therethrough and back to said moving water system, said coil forming an inductor as an integral portion of said transformerless fly-back pulse generator circuit,
 wherein said transformerless fly-back pulse generator circuit is configured to generate a direct current pulse that produces a magnetic field across said coil wound around said chamber when said direct current pulse is high, and when said direct current pulse is low said coil wound around said chamber discharges a voltage spike at a voltage level significantly higher than a voltage level of an input power supply,
 wherein said transformerless fly-back pulse generator circuit is configured to operate a nominal input power supply voltage of between about 6 and 30 volts, and
 wherein said transformerless fly-back pulse generator circuit does not include an inductor coil other than said coil wound around said chamber;
 wherein said power transistor is configured to function as a switch to drive said direct current pulse into said coil wound around said chamber when in an ON condition thereby generating said magnetic field within said chamber, and when in an OFF condition to terminate said direct current pulse into said coil wound around said chamber and permit said coil wound around said chamber to rapidly discharge to cause said voltage spike, and wherein said coil is wound around said chamber so as to transmit said magnetic field into said chamber in order to inhibit scale formation and microorganism growth within said chamber and within said moving water system.

2. The apparatus according to claim 1, wherein said transformerless fly-back pulse generator circuit comprises a pulse generator configured to drive said power transistor connected to said coil wound around said chamber repeatedly between said ON condition and said OFF condition.

3. The apparatus according to claim 2, wherein said pulse generator comprises a voltage controlled oscillator (VCO) configured to adjust a pulse width and a frequency of said direct current pulse signal.

4. The apparatus according to claim 3, wherein said VCO is analog, digital, or microprocessor based.

5. The apparatus according to claim 2, wherein said pulse generator is configured to generate a frequency of pulses in said direct current pulse signal between about 1 kHz and 300 kHz.

6. The apparatus according to claim 2, wherein said pulse generator is configured to generate pulses in said direct current pulse signal having a width of between about 33 microseconds and 1 millisecond.

7. The apparatus according to claim 1, wherein said power transistor is selected from said group consisting of:
 a field effect transistor (FET),
 a bipolar transistor,
 an insulated-gate bipolar transistor (IGBT), and
 a thyristor.

8. The apparatus according to claim 1, wherein said transformerless fly-back pulse generator circuit further comprises:
 a capacitor configured to limit an upper range of frequencies of said direct current pulse signal across said coil.

9. The apparatus according to claim 8, wherein said capacitor is configured to limit high frequencies in said coil to less than about 300 kHz.

10. The apparatus according to claim 1, further comprising:
 at least one additional coil wound around said chamber and connected to said transformerless fly-back pulse generator circuit.

11. The apparatus according to claim 1, wherein said chamber comprises a portion of a pipe of said moving water system.

12. The apparatus according to claim 1, wherein said chamber is configured to be inserted as a portion of said moving water system.

13. The apparatus according to claim 1, further comprising:
 an inlet tube configured to receive water from said moving water system and configured to feed said water into said chamber;
 an outlet tube configured to return said water fed into said chamber from said moving water system back into said moving water system; and
 a pump configured to draw said water into said chamber from said inlet tube and configured to facilitate movement of said water from said chamber back into said moving water system through said outlet tube.

14. A water treatment system for inhibiting scale formation and microorganism growth, said water treatment system comprising:
 a moving water system including a pipe; and
 a pulse-power assembly comprising a transformerless fly-back pulse generator circuit comprising:
  a power transistor; and
  a coil wound around a chamber for passing water from said moving water system therethrough and back to said moving water system, said coil forming an inductor as an integral portion of said transformerless fly-back pulse generator circuit,
 wherein said transformerless fly-back pulse generator circuit is configured to generate a direct current pulse that produces a magnetic field across said coil wound around said chamber when said direct current pulse is high, and when said direct current pulse is low said coil wound around said chamber discharges a voltage spike at a voltage level significantly higher than a voltage level of an input power supply,
 wherein said transformerless fly-back pulse generator circuit is configured to operate on a nominal input power supply voltage of between about 6 and 30 volts,
 wherein said transformerless fly-back pulse generator circuit does not include an inductor coil other than said coil wound around said chamber,
 wherein said power transistor is configured to function as a switch to drive said direct current pulse into said coil wound around said chamber when in an ON condition thereby generating said magnetic field within said chamber, and when in an OFF condition to terminate said direct current pulse into said coil wound around said chamber and permit said coil wound around said chamber to rapidly discharge to cause said voltage spike,
 wherein said coil is wound around said chamber so as to transmit said magnetic field into said chamber in order to inhibit scale formation and microorganism growth within said chamber and within said moving water system, and
 wherein said chamber is in fluid connection with said pipe.

15. The water treatment system according to claim 14, wherein said transformerless fly-back pulse generator circuit further comprises:
 a capacitor configured to limit an upper range of frequencies of energy across said coil wound around said chamber.

16. The water treatment system according to claim 14, wherein said apparatus further comprises:
 at least one additional coil wound around said chamber and connected to said transformerless fly-back pulse generator circuit.

17. The water treatment system according to claim 14, wherein said chamber comprises a portion of said pipe of said moving water system.

18. The water treatment system according to claim 14, wherein said apparatus further comprises:
 an inlet tube configured to receive water from said moving water system and configured to feed said water into said chamber;
 an outlet tube configured to return said water fed into said chamber from said moving water system back into said moving water system; and
 a pump configured to draw said water into said chamber from said inlet tube and configured to facilitate said movement of said water from said chamber back into said moving water system through said outlet tube.

19. The water treatment system according to claim 14, wherein said moving water system is selected from said group consisting of:
- a closed-loop system,
- an open-loop system, and
- a combined closed-loop and open-loop system.

20. A transformerless fly-back pulse generator circuit for inhibiting scale formation and microorganism growth within a moving water system, said transformerless fly-back pulse generator circuit comprising:
- a DC power source;
- a coil wound around a water pipe configured to move water from said moving water system therethrough and back to said moving water system, said coil forming an inductor as an integral portion of the transformerless fly-back pulse generator circuit, a first end of said coil wound around said water pipe being connected to a first terminal of said DC power source;
- a power transistor configured to operate as a switch to pass current from a second end of said coil wound around said water pipe, to a second terminal of said DC power source;
- a voltage-controlled oscillator configured to drive said power transistor between an ON state and an OFF state; and
- a capacitor coupled between said first end and said second end of said coil wound around said water pipe,
- wherein said power transistor is configured such that when in said ON state, said transformerless fly-back pulse generator circuit generates a direct current pulse signal that produces a magnetic field across said coil wound around said water pipe, and when said power transistor is in said OFF state said coil wound around said chamber discharges a voltage spike at a voltage level significantly higher than a voltage level of said DC power source,
- wherein said transformerless fly-back pulse generator circuit does not include an inductor coil other than said coil wound around said water pipe, and
- wherein said coil is wound around said water pipe so as to transmit said magnetic field into said water pipe to inhibit scale formation and microorganism growth within said water pipe and within then moving water system.

21. The pulse generator for inhibiting scale formation and microorganism growth within a moving water system according to claim 20, wherein said DC power source is a regulated DC power source.

22. The pulse generator for inhibiting scale formation and microorganism growth within a moving water system according to claim 20, wherein said pulse generator is a voltage controlled oscillator (VCO).

23. The pulse generator for inhibiting scale formation and microorganism growth within a moving water system according to claim 20, wherein said DC power source supplies between 6 and 30 volts.

24. The pulse generator for inhibiting scale formation and microorganism growth within a moving water system according to claim 20, wherein said pulse generator is configured to generate pulses having a frequency between 1 kHz and 300 kHz.

* * * * *